United States Patent
Wolan et al.

(10) Patent No.: US 9,856,345 B2
(45) Date of Patent: Jan. 2, 2018

(54) LOW VISCOSITY DIMETHOXY AMINO SILANE POLYURETHANE WITH TRIETHOXY SILYL GROUPS FOR SEALANTS AND ADHESIVES WITH EASY PROCESSING, HIGH TENSILE STRENGTH AND LOW METHANOL EMISSIONS ON CURING

(71) Applicants: Vladimyr Wolan, Glen Iris (AU); Peter Zhang, Victoria (AU)

(72) Inventors: Vladimyr Wolan, Glen Iris (AU); Peter Zhang, Victoria (AU)

( * ) Notice: Subject to any disclaimer, the term of this patent is extended or adjusted under 35 U.S.C. 154(b) by 0 days.

(21) Appl. No.: 14/220,115

(22) Filed: Mar. 19, 2014

(65) Prior Publication Data

US 2015/0266995 A1 Sep. 24, 2015

(51) Int. Cl.
| | |
|---|---|
| *C08G 18/10* | (2006.01) |
| *C08G 18/12* | (2006.01) |
| *C08G 18/28* | (2006.01) |
| *C08G 18/42* | (2006.01) |
| *C08G 18/48* | (2006.01) |
| *C08G 18/50* | (2006.01) |
| *C08G 18/75* | (2006.01) |
| *C08G 18/77* | (2006.01) |
| *C09D 175/08* | (2006.01) |
| *C09J 175/08* | (2006.01) |
| *C09K 3/10* | (2006.01) |

(52) U.S. Cl.
CPC .......... *C08G 18/778* (2013.01); *C08G 18/10* (2013.01); *C08G 18/12* (2013.01); *C08G 18/42* (2013.01); *C08G 18/4812* (2013.01); *C08G 18/4866* (2013.01); *C08G 18/5096* (2013.01); *C08G 18/755* (2013.01); *C09D 175/08* (2013.01); *C09J 175/08* (2013.01); *C09K 3/1021* (2013.01); *C08G 18/289* (2013.01); *C08G 2190/00* (2013.01)

(58) Field of Classification Search
CPC .... C08G 18/10; C08G 18/42; C08G 18/5096; C08G 18/718; C08G 18/778; C08G 18/289; C08G 18/4866; C08G 18/755; C08G 18/12; C08G 18/4812; C08G 2190/00; C09D 175/08; C09J 175/08; C09K 3/1021
See application file for complete search history.

(56) References Cited

U.S. PATENT DOCUMENTS

| | | | | |
|---|---|---|---|---|
| 5,990,257 | A * | 11/1999 | Johnston | C08G 18/10 528/28 |
| 7,732,554 | B2 * | 6/2010 | O'Keefe | C08G 18/089 528/28 |
| 2003/0092932 | A1 * | 5/2003 | Tong | C08G 18/10 560/352 |
| 2012/0165493 | A1 * | 6/2012 | Stanjek | C08G 65/336 528/17 |
| 2013/0281562 | A1 * | 10/2013 | Burckhardt | C07F 7/1836 521/154 |

* cited by examiner

*Primary Examiner* — Patrick Niland
(74) *Attorney, Agent, or Firm* — Muskin & Farmer, LLC

(57) ABSTRACT

The present method relates to the production of low viscosity dimethoxy amino silane polyurethane with triethoxy silyl groups, as well as the production of sealants, adhesive and paint compositions using the alcoxysilane capped polymers formed from the present method. The method of production results in final alcoxysilane capped polymers that have a low viscosity and are safer for manufacturers, and end users.

1 Claim, 3 Drawing Sheets

LOW VISCOSITY DIMETHOXY AMINO SILANE POLYURETHANE WITH TRIETHOXY SILYL GROUPS FOR SEALANTS AND ADHESIVES WITH EASY PROCESSING, HIGH TENSILE STRENGTH AND LOW METHANOL EMISSIONS ON CURING

FIELD OF THE INVENTION

A method for producing a composition of silylated polyurethane combining the use of different alkoxy molecules to allow for low viscosity, fast cure and easy processing with wet calcium carbonate fillers and adhesive, sealants and paint composition formed from the method.

BACKGROUND

The development of silane terminated polyether and polyurethane polymers to replace standard isocyanate capped polyurethane prepolymers in one component moisture curing compositions have, in the last 15 years, shown that these polymers are of lower toxicity, are easy to process and are a good alternative polymer to replace Polyurethane (PU) prepolymers. The new higher molecular weight double metal cyanide complex catalyst (DMC)-containing low monol polyether polyols, produced by most manufacturers, have also made a big improvement in the physical properties of these silane cross linked polymers. There has now been substantial replacement of solvent and some free isocyanate monomer containing sealants and adhesives in many market segments using traditional toluene diisocyanate (TDI) or methylene diphenyl diisocyanate (MDI) based PU adhesives. The advantages of the good UV resistance provided by these silane modified polyether polymers has been very significant and is due to the absence of any aromatic molecular groups. These difunctional methoxy silane capped polyether polymers have easy processing properties because the reinforcing precipitated calcium carbonates and carbon black fillers can be processed undried with the polymer and then dried with a moisture scavenger such as vinyl trimethoxy silane. This is a great advantage over polyurethane polymers that are an isocyanate group (NCO) terminated prepolymer, where the powders need to be very dry before mixing with the prepolymers. There is however a minor disadvantage due to possible methanol emission on curing and high catalyst and amino silane content needed for fast curing adhesives.

An alternate polymer design where an isocyanate terminated prepolymer is capped with a secondary amino propyl trimethoxy silane (of various types) has shown the benefits of better crosslinking of the trimethoxy silane and the low monol DMC process with the use of high molecular weight polyether. This type of polymer design allows the use of high di-isodecyl phthalate (DIDP) plasticizer content as used with standard PU prepolymers and can produce sealants and adhesives with good elastic recovery and low tin catalyst content. Therefore, this type of polymer design is a good alternate to PU prepolymers. However, a major disadvantage of this polymer design is its high polymer viscosity in the range of 50,000 Mpas to 100,000 Mpas, which necessitates the use of plasticizer contents of at least 20 percent in the polymer to make the polymer process functional in a sealant factory. Due to this high viscosity, drums of these polymers are impossible to empty satisfactorily. Additionally, high plasticizer content in the formulation can result in soft sealants and a tacky surface on cure. Furthermore, moisture sensitivity of the trimethoxy silanes is an issue in manufacturing and these polymers must be processed with completely dry calcium carbonates, or alternately, the calcium carbonates must be dried with the plasticizer before mixing them into the polymer.

The composition of silane terminated polyurethanes is well known, and nearly all diisocyanate molecules are capable to being reacted partially with a hydroxyl functional polymer and then the free NCO groups capped with a secondary amino silane. The preferred diisocyanates are the aliphatic diisocyantes, and Hexamethylene diisocyanate (HDI) and Isophorone Diisocyanate (IPDI), however, there are many combinations known to practitioners of the art.

The high viscosities of PU prepolymers and also the secondary amino silane capped polyurethane polymers are due to the hydrogen bonding developed between the urethane and urea groups where the double bonded oxygen atom and the hydrogen on the nitrogen atoms in adjacent polymer chains form a cross-chain hydrogen bond. The increased viscosity can be reduced in a urea by adding a bulky group to the nitrogen of the secondary amino silane and the use of phenyl, cyclohexyl, aspartame ester and diethyl maleate or octyl maleate and other groups is documented and is well-known. Due to the fact that the polymer chains and their associated hydrogen bonding exist in three dimensions, viscosity reducing methods can vary in their efficiencies. Some methods have employed adding propylene carbonate and long chain alcohols as a plasticizer to reduce viscosity of these silane terminated polyurethane prepolymers where secondary amino silanes are used. However, there is a need for improvement.

A replacement is needed for standard TDI and MDI based prepolymers that contain solvents like xylene or toluene in the prepolymer, along with some free NCO containing monomer that is very difficult to remove. This replacement should provide formulators and their factories a safer low toxicity and lower viscosity polymer. Additionally, a method is needed where formulators are able to manufacture sealants in a very similar process to what is currently used with current prepolymers and formulations. The formulators need stable thinner polymers, moisture scavengers and cure inhibitors enabling the formulation of products that can be manufactured in equipment that is normally used for high volume PU sealant production. The solution should be able to replace current proven PU sealant formulations with less development and advantages in physical properties such as UV exposure resistance and better adhesion with no primers.

Although there are many known advantages of methyl dimethoxy silane end capping of polyurethanes, such as having low moisture sensitivity and an easier manufacturing process, the viscosity of these polymers is still a major problem. This issue needs to be addressed in order to make such polymers commercially viable and the present method provides some solutions to that problem.

What is needed is a method of producing a low viscosity dimethoxy amino silane polyurethane with triethoxy silyl groups, which can reduce the problems associated with the current use of methyl dimethoxy silane terminated end capped polyurethanes, in order to facilitate the manufacture of sealants, adhesives and paint compositions.

SUMMARY OF THE INVENTION

An aspect of the present method is to provide a low viscosity dimethoxy amino silane polyurethane with triethoxy silyl groups, which can reduce the problems associated with the current use of methyl dimethoxy silane terminated end capped polyurethanes. Another aspect of the present invention are adhesives, sealants and paint compositions made from the polymer composition formed by the present method.

The above aspect can be achieved by a method of polymer production comprising: creating a polymeric composition by supplying a hydroxyl terminated polypropylene glycol polyether, capping some of the hydroxyl terminated polypropylene glycol polyether with diisocyanate, capping the NCO terminated part of the polypropylene glycol polyether with a secondary amino silane, capping the remainder of the hydroxyl terminated polypropylene glycol polyether with isocyanato silane and modifying the viscosity with the addition of vinyl silane and methanol.

BRIEF DESCRIPTION OF THE DRAWINGS

Further features and advantages of the present product and method and various embodiments of the present product and method, will become apparent and more readily appreciated from the following description of the preferred embodiments, taken in conjunction with the accompanying drawings of which.

DETAILED DESCRIPTION

Figure 1:
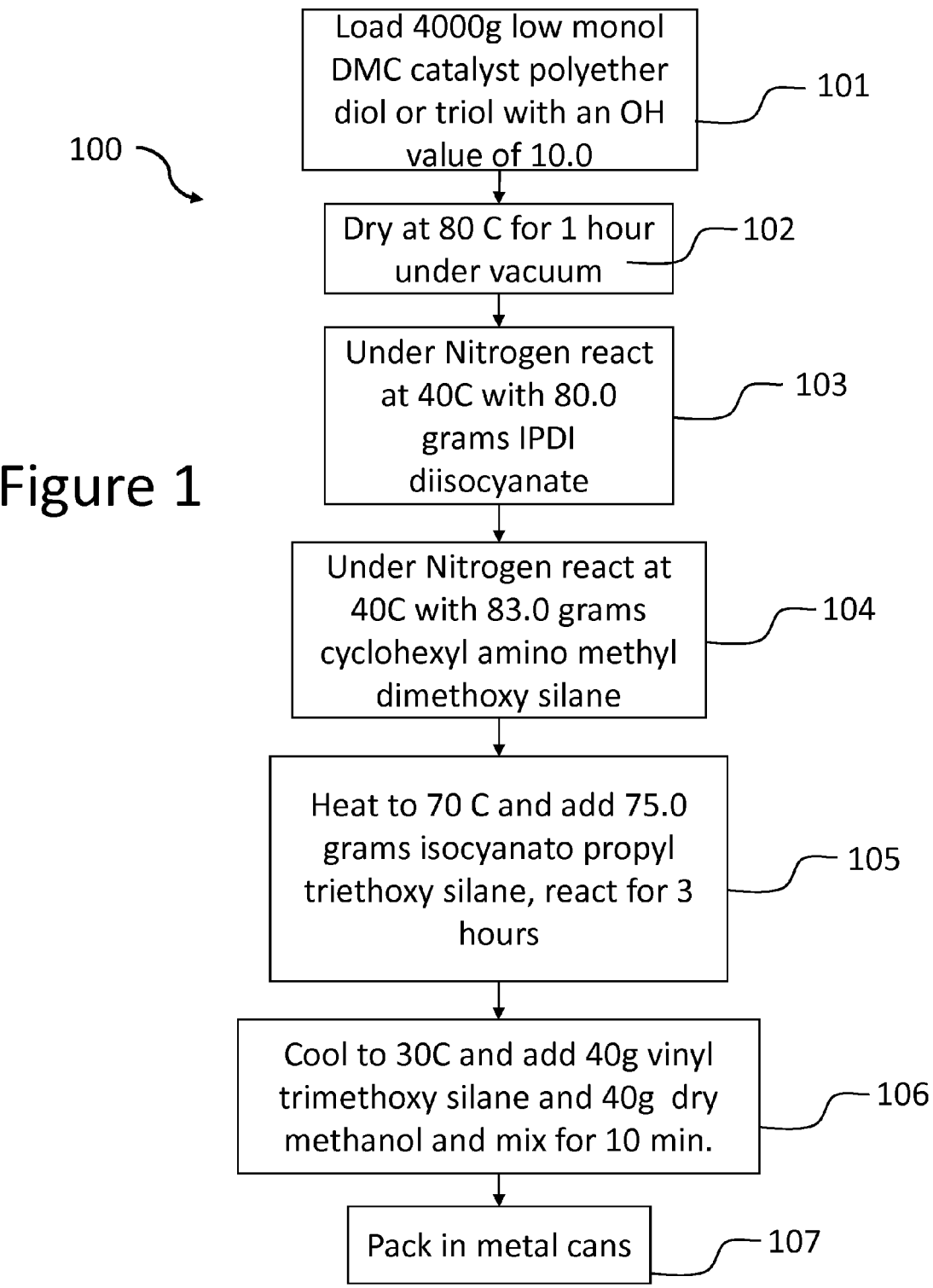
FIG. 1 is a flowchart showing the steps required to create a methyl dimethoxy silane and triethoxy capped hybrid polymer, according to a method.

This description of the exemplary embodiments is intended to be read in connection with the accompanying drawings, which are to be considered part of the entire written description.

The current method can be a further development in the family of alcoxysilane terminated polymers, which can have the benefit of the use of methyl dimethoxy gamma silane terminated polyurethanes by combining the secondary amino silane end capping process with an end cap of isocyanato propyl triethoxy silane. The resultant polymer has a low viscosity in the range of 10000 Mpas to 20000 Mpas. Additionally, the use of the methyl dimethoxy and triethoxy silanes can maintain the low moisture sensitivity needed to process the polymer with powders that contain some moisture and can be dried with moisture scavengers like vinyl trimethoxy silane. Curing speeds using this polymer can also be improved.

The present method can comprise a polyether chain with two different alkoxy end groups with some hydrogen bonding reduction molecules added, which can allow a formulator the ability to manufacture a sealant or adhesive using a simpler process with an open time from 15 minutes to 1.0 hours. The polymer can be used in sealants and adhesives that provide good UV resistance, good adhesion to various surfaces, and the advantage of lower methanol emission during curing.

The polymers can be composed of a backbone of polyurethane, polyether, polyester, polyacrylate and can be any polymer or polyether of linear or cross linked composition with free reactive hydroxyl groups available for reaction. The choice of the backbone can be made to give the required hardness, tensile and elongation properties when capping hydroxyl groups with a difunctional isocyanate and secondary amino silane in the first step, and an isocyanato triethoxy silane in the second step. The final part of the process can be to add several viscosity reducing molecules that also have secondary benefits in the composition.

In the DMC process, low monol polyether polyols can be the preferred option. These diol or triol polyols, or a combination of diols and triols with two or more hydroxyl groups at each chain end, are first changed to an NCO terminated prepolymer wherein 30 percent to 70 percent of the hydroxyl groups can be reacted with a diisocyanate, with isophorone diisocyanate (IPDI) being the preferred molecule. The faster reacting NCO groups on the IPDI molecule attach to the hydroxyl groups of a polyether, and the second, slower reacting NCO groups can then be capped with a secondary amino silane with cyclohexyl amino propyl methyl dimethoxy silane being the preferred molecule. The final step can be to react the remaining 30 percent to 70 percent of the unreacted hydroxyl groups of the polyether with an isocyanato propyl triethoxy silane.

It has also been found that a small amount of vinyl trimethoxy silane, and methanol at about one percent, each inhibit the urea hydrogen bond formation across adjacent chains as normally found in polymers that contain these groups. The small methanol and vinyl trimethoxy silane molecules hydrogen attach to the carbamate and nitrogen groups using normal hydrogen bonding and block the hydrogen bonding between adjacent polymer chains resulting in a lower polymer viscosity. The methanol can also have the function of retarding the moisture reaction of the methoxy silane groups to the silanol molecule which is the first stage of methoxy cross linking. The methanol can be removed under vacuum in the sealant manufacturing process and can have the secondary effect of helping reduce moisture levels as water is very soluble in methanol. The methanol also very efficiently caps any residual NCO groups to ensure the final polymer is NCO free.

In the normal sealant manufacturing process, where residual moisture is reduced under vacuum, there is a need for additives to help reduce moisture levels before a catalyst is added. It is common in PU sealant formulation practice to use the very toxic paratoluenesulphonicisocyanate (PTSI), a fast moisture scavenger, to reduce moisture content as the reaction is faster than the NCO capped isocyanate polymers. The sealant formulation using methyl dimethoxy and triethoxy silane terminated polyether polymers can have the safer vinyl trimethoxy silane as the moisture scavenge, and some can be present in the polymer and thus, can have two functions. Using vinyl silane at about 50 degrees C. in the drying process, enables one of the ethoxy molecules on the triethoxy silane to be interchanged with one of the methoxy molecules on the vinyl silane. This interchange can speed up the curing rate of the triethoxy silane, which is known to be slow.

For the methyl dimethoxy silane polyurethane cap combined with the triethoxy isocyanato cap on the same polyether chain, it can be sufficient to use vinyl silane as the moisture scavenger combined with a process where a high shear step is included with high vacuum to eliminate residual moisture from calcium carbonate fillers. The methyl dimethoxy silane and triethoxy silanes are slower to react with moisture compared with trimethoxy vinyl silanes. Temperatures of about 50 degrees C. with high vacuum are sufficient to dry the sealant or adhesive before catalyst addition to form a one part RTV composition.

With these combinations of alkoxy terminated polyether chains and several small additions of commonly used chemicals, the sealant and adhesive formulators can be offered a new low viscosity polymer and a production method that has the advantage of lower methanol release on cure, the ability to control curing rates and adhesive strength, and they can use currently known tin containing catalysts and secondary amino silanes as the catalyst system. The triethoxy terminated silane forms the less poisonous methanol molecule upon the curing reaction. Paint applications can use the composition with polypropylene glycol triols for the higher crosslinking needed for harder paint coatings.

Reference will now be made in detail to the presently preferred embodiments of the present polymer and method to produce the polymer, examples of which are illustrated in the accompanying drawings, wherein like reference numerals refer to like elements throughout.

Figure 3:
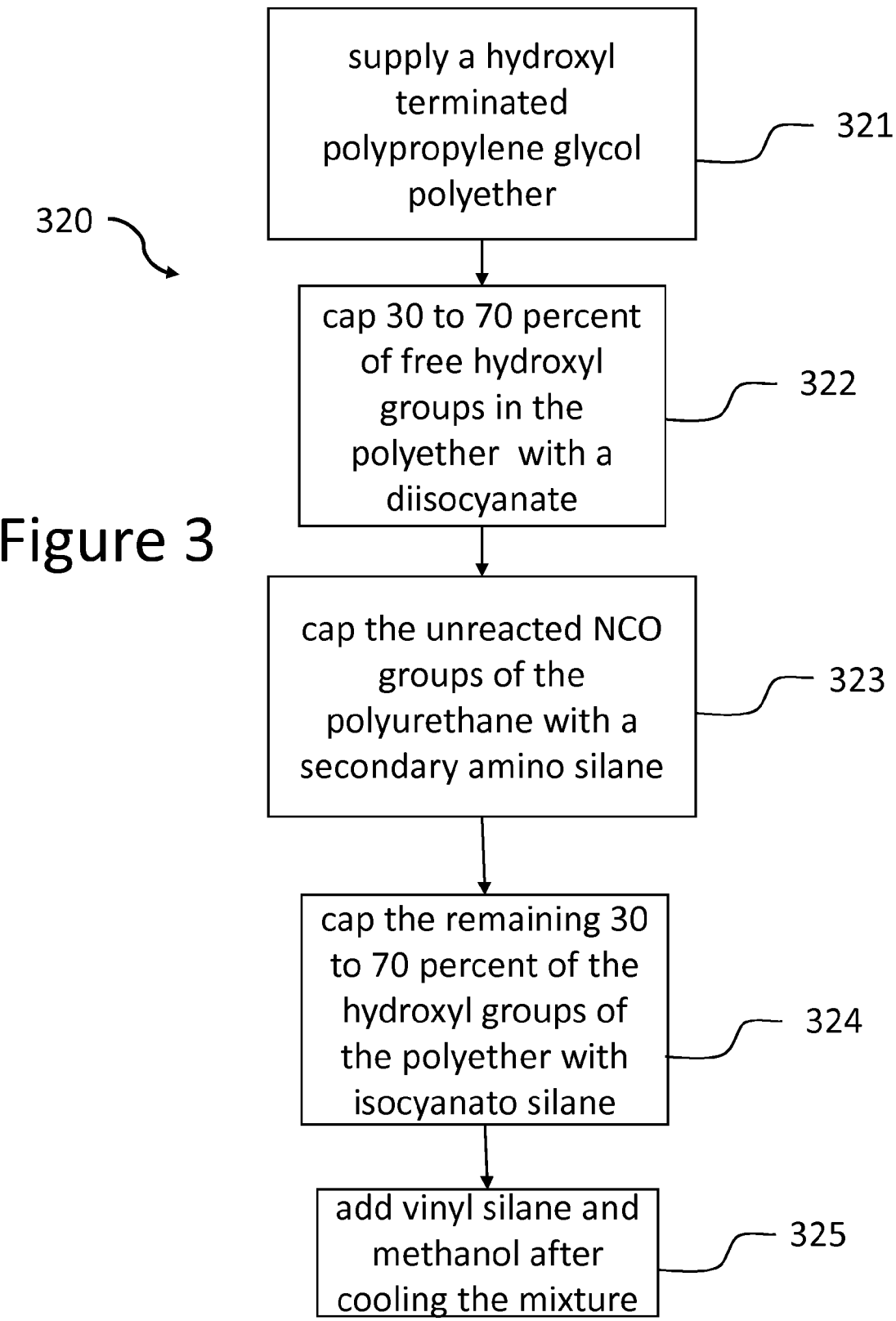
FIG. 3 is a flow chart showing an overview of the steps required to create a methyl dimethoxy silane and triethoxy capped polymer, according to a method.

FIG. 3 is a flow chart showing an overview of the steps required to create a methyl dimethoxy silane and triethoxy capped polymer 320, according to a method. A hydroxyl terminated polypropylene glycol polyether can be supplied 321. The hydroxyl terminated polypropylene glycol polyether can be partially capped with diisocyanate 322. The newly formed Polyurethane compound with free NCO groups can then be capped with a secondary amino silane 323. This partially capped polymer, with some unreacted hydroxyl groups, can then be capped with isocyanato silane 324. Finally, the viscosity of the product can be modified by adding vinyl silane and methanol 325.

EXAMPLES

Methyl Dimethoxy Silane and Triethoxy Capped Hybrid Polymer A

FIG. 1 is a flowchart showing the steps to create a methyl dimethoxy silane and triethoxy capped hybrid polymer 100, according to a method.

In a standard five liter laboratory flask with good stirring, 4000 grams of low monol DMC catalyst based polyether blend of diol and triol can be loaded with an OH value of 10.0 101. This mixture can be dried at 80 degrees C. for one hour under vacuum to eliminate moisture which can be approximately 0.05 percent 102. The dry polyether can then be cooled and reacted under nitrogen at 40 degrees C., with 80.0 grams IPDI isocyanate to cap half the OH groups with approximately half the NCO groups of the diisocyanate 103. The free NCO groups of the partially formed polyurethane chain can then be reacted in a second step at 40 degrees C. with approximately 83.0 grams of cyclohexyl amino methyl dimethoxy silane 104 until the reaction shows very little residual NCO by FTIR analysis. This can result in half the polyether ends being capped with a methyl dimethoxy silane molecule that can be reactive to moisture and crosslinking with other silanes.

The mixture can then be heated to approximately 70 degrees C. and an addition of 75.0 grams of isocyanato propyl triethoxy silane can be made. This mixture can be reacted for 3 hours 105 until the NCO of the polymer is very low and reaches the target as measured by FTIR. Nearly all of the original OH groups of the polyether can now be reacted and contain a reactive alcoxy silane group. This can be seen on the changed FTIR trace.

The above polymer can be cooled in the laboratory flask to 30 degree C. and an addition of 40 grams of Vinyl trimethoxy silane and 40 grams dry laboratory grade methanol and mixing can be continued for approximately ten minutes 106 and then packed into one liter metal cans 107. The methanol addition can ensure that any residual NCO is reduced to near zero. A reduction in viscosity can develop over 24 hours. The resultant polymer can be cooled and viscosity the next day can be 16000 Mpas at 25 degrees C. Open time before skinning of this hybrid polymer when mixed with 1% TIB KAT 226 diketonate tin catalyst and 1% KBM603 silane can be approx. 20 minutes at 25 degrees C. and 50% humidity in a laboratory glass dish. Shore A hardness can be approx 35 after 5 days cure. The cured polymer can be very stable in a closed 1 liter metal container, with little change in viscosity for approximately 6 months.

Adhesive Formulation with Hybrid Polymer A

Figure 2:
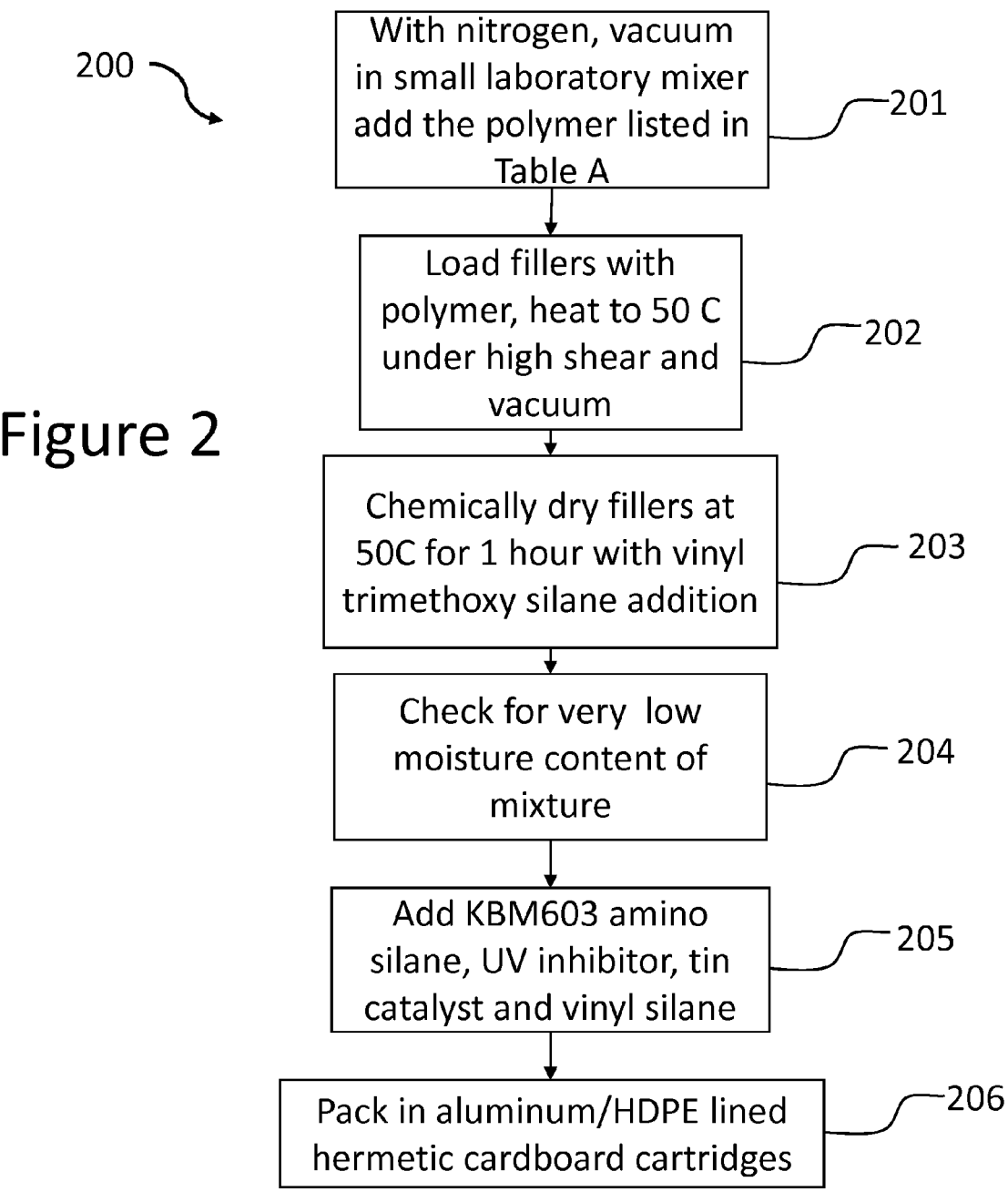
FIG. 2 is a flowchart showing the steps to create an adhesive using methyl dimethoxy silane and triethoxy capped hybrid polymer, according to a method.

FIG. 2 is a flowchart showing the steps to create an adhesive using methyl dimethoxy silane and triethoxy capped hybrid polymer 200, according to a method.

A standard 5 liter laboratory planetary mixer, with nitrogen, vacuum and small press an adhesive can be produced using Hybrid polymer A 201. Separate powder drying facilities are not needed and the fillers with some moisture content can be loaded with the polymer, heated to approximately 50 degrees C. under high shear and high vacuum to remove most of the powders moisture 202, and then chemically dried at 50 degree C. for 1 hour with vinyl trimethoxy silane 203. After drying with vinyl silane, the adhesive can be checked for moisture content using the Carl Fisher process 204. When the moisture content is low enough for a stable adhesive formulation (0.001 percent), the final additions of secondary amino silane, UV inhibitor, tin catalyst and some vinyl silane for open time control can be added 205. The adhesive can then be packed into aluminium/HDPE lined hermetic cardboard cartridges 206 and tested.

The base formulation is in grams and can be adjusted for the mixer used and include:

TABLE A

| Hybrid polymer A | 1000 grams |
| Ultra-Pflex PCC | 1000 grams |
| Carbon black | 50 grams |
| Vinyl silane | 50 grams |
| Amino KBM603 | 20 grams |
| TIB KAT 226 catalyst | 20 grams |
| Tinuivin B75 | 10 grams |
| Vinyl silane | 50 grams |

The mechanical properties of the above Black Industrial Adhesive using Hybrid Polymer A are listed below.

TABLE B

| Tack free time | 15 minutes |
| Viscosity Mpas | 1,500,000 |
| Slump resistance | very good |
| VOC | 1.20 percent loss |
| SG g/cm3 | 1.45 |
| Tensile at break | 3.40 n/mm2 |
| Elongation % | 245 at break |
| Hardness Shore A | 60 |

This is a basic formula and can be adjusted in many ways to suit specific adhesive and sealant requirements. The addition of DIDP plasticizer in the formulation to replace some of the polymer results in a lower tensile strength with increased elongation.

While the major embodiments of the innovation are illustrated and described herein, it is not intended that these illustrate all possible uses of the innovation, rather the methods describe how the combined methyl dimethoxy amino silane and triethoxy silane hybrid polymers can be used to produce low viscosity, less toxic, and more commercially viable compositions suitable as an alternative to PU prepolymers. The examples show sealant properties close to commercial PU sealants based on the use of TDI and MDI isocyanate. The DMC polyether Polyol, which are preferred, are blended to achieve a target OH value and consistent tensile properties as the variation from manufacturers of polyether OH value is significant. Resins or polymers with mixtures of diols and triols can result in enhanced properties as is well known in polyurethane technology. Precipitated calcium carbonate usage allows the development of thicker adhesives and sealants at less cost. Processing of this polymer design is excellent and easy compared to polyurethane prepolymers.

The amounts of each of the compounds described in the methods above can be varied and still fall within the scope of the present methods. Examples having specific volumes and weights are provided to inform the reader and are not intended to be read as limitations to the present methods.

What is claimed is:

1. A method of producing methyl dimethoxy silane and triethoxy capped polymer, the method comprising:
    creating a polymeric composition, wherein the polymeric composition comprises acrylic groups comprising hydroxyl groups by:
    supplying a hydroxyl terminated polypropylene glycol polyether;
    capping some of the hydroxyl terminated polypropylene glycol polyether with diisocyanate;
    capping the remaining NCO groups with a secondary amino silane;
    capping the remaining hydroxyl groups of the polypropylene glycol polyether with isocyanato silane; and
    cooling the polymeric composition to approximately 30 degrees C. and modifying the viscosity with the addition of vinyl silane and methanol.

* * * * *